C. T. ENGLE.
FLOUR SIFTER.
APPLICATION FILED JULY 20, 1916.
1,238,007.
Patented Aug. 21, 1917.
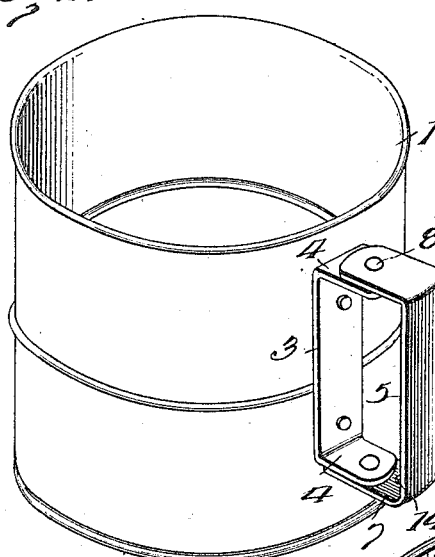
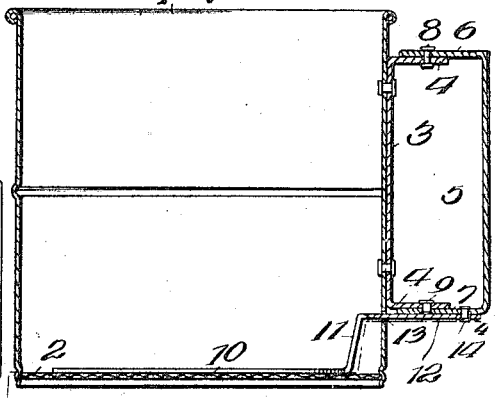
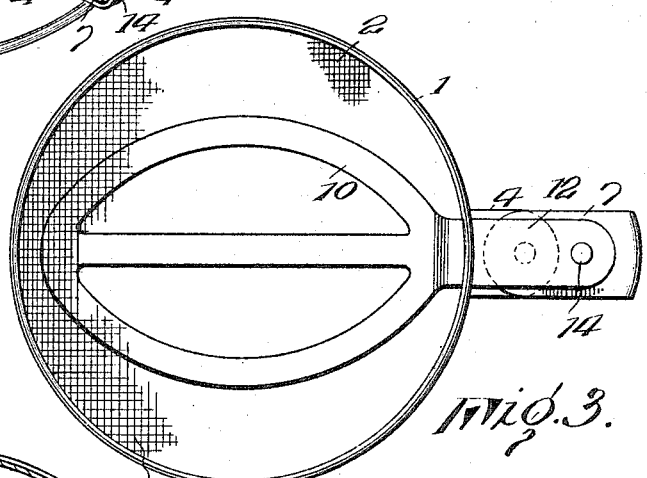
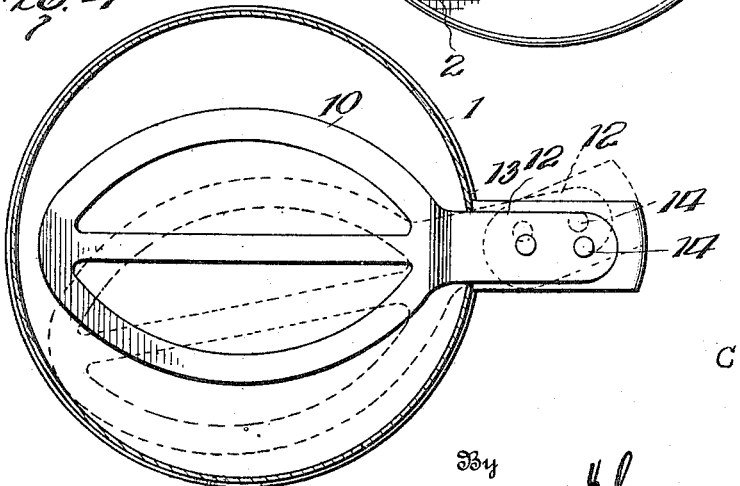
Inventor
C. T. Engle.
By
Attorneys.

UNITED STATES PATENT OFFICE.

CHARLES T. ENGLE, OF COLORADO SPRINGS, COLORADO.

FLOUR-SIFTER.

1,238,007.      Specification of Letters Patent.      Patented Aug. 21, 1917.

Application filed July 20, 1916. Serial No. 110,365.

*To all whom it may concern:*

Be it known that I, CHARLES T. ENGLE, a citizen of the United States, residing at Colorado Springs, in the county of El Paso and State of Colorado, have invented certain new and useful Improvements in Flour-Sifters, of which the following is a specification.

This invention relates to flour sifters of the shaker type and has as its object to provide a sifter of this type which may be readily and conveniently manipulated in sifting flour and which will effectually sift the flour without any waste thereof or without the coarser particles within the sifter body being liable to fall into the finer particles which have passed through the sifter screen.

It is one aim of the invention to provide, in a sifter of the type mentioned, a novel arrangement of the agitator and handle and a novel connection between the two permitting of effective oscillation of the agitator without likelihood of flour sifting through the opening in the wall of the body of the sifter through which the shank of the agitator extends.

It is another aim of the invention to so connect the shank of the agitator with the handle of the sifter that the body of the agitator will be held firmly upon the surface of the sifter screen thereby rendering the sifter more efficient.

In the accompanying drawings:

Figure 1 is a perspective view of the sifter embodying the present invention;

Fig. 2 is a vertical longitudinal sectional view therethrough;

Fig. 3 is a bottom plan view;

Fig. 4 is a horizontal sectional view on the line 4—4 of Fig. 2, looking upwardly from the bottom of the sifter.

In the drawings the body of the sifter is indicated by the numeral 1 and is preferably cylindrical in form and provided in its lower end with a sifting screen indicated by the numeral 2 preferably of wire mesh material. The body may be of any desired construction and the sifter screen may be mounted therein in any desired manner.

The handle for the sifter is connected with the body by means of a bracket which includes a portion 3 secured in any suitable manner to one side of the body 1 and extending vertically thereof and this portion 3 is provided at its upper and lower ends with outwardly extending ears 4. The handle comprises a grip portion 5 having forwardly extending upper and lower terminal portions or ears, indicated by the numerals 6 and 7 respectively and the handle is disposed with the portion 6 extending above the upper ear 4 and connected therewith by means of a pivot 8, the lower terminal portion 7 of the handle extending below the lower ear 4 and being connected therewith by means of a pivot 9. It will now be apparent that when the handle 5 is grasped, the sifter body may be oscillated by imparting a lateral shaking motion to the said handle and the agitator for the sifter is so arranged and so connected with the handle 5 that in such movement of the sifter body, the agitator will be oscillated or moved across the upper surface of the sifter screen 2.

The agitator above mentioned may be of any desired construction and form, but is here shown as in the nature of an elliptical open body 10 provided with a shank 11 which extends upwardly from one end of the said body and which is provided with a terminal portion 12 which extends at substantially right angles to the portion 11 and through a slot 13 formed in the wall of the body 1 immediately below the point of location of the lower ear 4 of the handle bracket. The slot 13 is of a length equal to the width of the terminal portion 12 of the agitator shank and as will presently be made apparent, the end walls of the slot constitute a fulcrum for the said portion of the agitator shank, the edges of the portion 12 of the said shank riding against the said end walls of the slot. As before stated, the portion 12 of the shank extends through the slot 13 and exteriorly of the body 1 and immediately below the terminal portion 7 of the handle 5 and, in fact, the said portion 12 bears firmly against the underside of the said terminal portion 7 of the handle for a purpose to be presently explained. A pivot 14 is passed through the portion 7 of the handle and through the end of the portion 12 of the agitator shank, as clearly shown in Fig. 3 of the drawings, this pivot being located between the lower end of the grip portion of the handle and the shank 11.

From the foregoing description of the invention, it will be understood that when the handle 5 is grasped in the hand and a lateral shaking motion is given the device as a whole, the body 1 will oscillate upon the pivots 8 and 9 and as the said body so moves the agitator will be caused to oscillate due to the coaction of the edges of its portion 12 with the end walls of the slot 13 and the pivotal connection of the said portion with the handle. Inasmuch as the slot 13 is of a length substantially equal to the portion 12 of the shank of the agitator, the portion 12 may oscillate within the slot without any likelihood of the flour sifting through the said slot, which, however, would occur if the shank portion 12 were rigidly secured to the lower terminal portion 7 of the handle 5 inasmuch as in such construction the slot 13 would have to be sufficiently long to permit of back and forth movement of the said shank 12 therein. As pointed out above the portion 12 of the shank of the agitator bears firmly against the underside of the terminal portion 7 of the handle and the parts are so proportioned and so relatively arranged that this coaction of the said shank portion with the said handle portion will result in the body 10 of the agitator being held firmly in contact with the upper surface of the sifter screen 2, the shank of the agitator being resilient for the purpose stated.

Having thus described the invention, what is claimed as new is:

1. A device of the class described including a handle, a body pivotally mounted on the handle, and an agitator disposed within the body and having a portion thereof extended through the wall of the body and pivotally connected with the handle at the rear of the pivot of said body.

2. A device of the class described including a handle, a body pivotally mounted on the handle and having a sifting diaphragm, the wall of the body being provided with an opening, and an agitator disposed within the body at said sifting diaphragm and having a portion thereof extending through the opening in the body and pivotally connected with the handle at the rear of the pivot of said body.

3. A device of the class described including a body having a sifting diaphragm, a bracket secured to the body and provided with spaced ears, a handle pivotally connected to said ears, and an agitator arranged within the body and having a portion thereof extended through an opening in the body and pivotally connected with the handle at the rear of the pivotal connection between the ears and handle.

4. A device of the class described including a body having a sifting diaphragm and provided with an opening, a bracket secured to the body and provided with spaced ears, a handle pivotally connected with said ears, and an agitator arranged within the body and having an extension projecting through said opening and pivotally connected with the handle at the rear of the pivotal connection between the ears and handle, the end walls of the opening in the body constituting a fulcrum upon which the agitator is oscillated.

5. A device of the class described including a handle, a body pivotally connected with the handle for oscillatory movement and provided with a sifting diaphragm, said body being provided with an opening, and an agitator arranged within the body and having an upstanding shank terminating in a lateral extension projecting through the opening in the body, said extension being pivotally connected to the handle at a point at the rear of the pivotal connection between the handle and said body, the end walls of the opening in the body constituting a fulcrum upon which the extension of the shank oscillates.

6. A device of the class described comprising a body having a sifting diaphragm and provided with an opening, a bracket rigidly secured to the body and provided with spaced laterally extending ears, a handle having spaced ears overlapping the ears of the bracket and pivotally connected therewith, the upper and lower pivots being disposed in vertical alinement, and an agitator arranged within the body at the sifting diaphragm and provided with a terminal portion extending through the opening in the body and overlapping and bearing against the lower surface of the adjacent co-acting ears and pivotally connected with the handle at a point at the rear of the pivot pin of said ears, the walls of the opening constituting a fulcrum for the agitator.

7. A device of the class described including a body having a sifting diaphragm and provided with a transverse opening, a handle pivotally connected with the body, and an agitator mounted for oscillation within the body at said sifting diaphragm and having a flat shank, a portion of which is offset and thence extended through the opening in the body and across the pivotal connection between the handle and said body, the terminal of the shank being pivotally connected with the handle at a point at the rear of the pivotal connection between the handle and body.

In testimony whereof I affix my signature.

CHARLES T. ENGLE. [L. S.]

Copies of this patent may be obtained for five cents each, by addressing the "Commissioner of Patents, Washington, D. C."